United States Patent [19]

Mercando et al.

[11] Patent Number: 6,114,403
[45] Date of Patent: *Sep. 5, 2000

[54] POLYURETHANE CATALYST COMPOSITIONS FOR IMPROVING RIGID FOAM PERFORMANCE

[75] Inventors: Lisa Ann Mercando, Pennsburg; Jane Garrett Kniss, Kempton; John William Miller, Allentown, all of Pa.

[73] Assignee: Air Products and Chemicals, Inc., Allentown, Pa.

[ * ] Notice: This patent is subject to a terminal disclaimer.

[21] Appl. No.: 09/328,674

[22] Filed: Jun. 9, 1999

[51] Int. Cl.⁷ .................................................... C08J 9/04
[52] U.S. Cl. .......................... 521/128; 521/129; 521/155; 428/423.1; 312/401
[58] Field of Search .................................... 521/128, 129, 521/155; 428/423.1; 312/401

[56] References Cited

U.S. PATENT DOCUMENTS

| | | |
|---|---|---|
| 4,007,140 | 2/1977 | Ibbotson . |
| 4,094,827 | 6/1978 | McEntrie . |
| 4,194,069 | 3/1980 | Speranza et al. . |
| 4,242,467 | 12/1980 | Zimmerman . |
| 4,310,632 | 1/1982 | Horacek et al. . |
| 4,330,656 | 5/1982 | Grogler et al. . |
| 4,644,017 | 2/1987 | Haas et al. . |
| 5,057,480 | 10/1991 | Petrella . |
| 5,859,079 | 1/1999 | Mercando et al. . |

FOREIGN PATENT DOCUMENTS 3027796  8/1994  Germany .

*Primary Examiner*—John M. Cooney, Jr.
*Attorney, Agent, or Firm*—Michael Leach

[57] ABSTRACT

A polyurethane catalyst composition comprises N,N'-bis(3-dimethylaminopropyl) urea and 3-dimethylaminopropyl urea in a ratio that can be varied to systematically control flowability, % open cell content and k-factor value for rigid polyurethane foam to enhance processibility. Increasing the N,N'-bis(3-dimethylaminopropyl) urea to 3-dimethylaminopropyl urea ratio decreases the open cell content and k-factor value of the foam whereas decreasing the N,'N-bis(3-dimethylaminopropyl) urea to 3-dimethylaminopropyl urea ratio improves the flowability of the foaming composition.

22 Claims, No Drawings

POLYURETHANE CATALYST COMPOSITIONS FOR IMPROVING RIGID FOAM PERFORMANCE

BACKGROUND OF THE INVENTION

The present invention relates to tertiary amine catalysts for producing rigid polyurethane foam.

Polyurethane foams are widely known and used in automotive, housing and other industries. Such foams are produced by reaction of a polyisocyanate with a polyol in the presence of various additives. One such additive is a chlorofluorocarbon (CFC) blowing agent which vaporizes as a result of the reaction exotherm, causing the polymerizing mass to form a foam. CFCs were of value in insulating rigid foams due to their low thermal conductivity as measured by their k-factors.

The discovery that CFCs deplete ozone in the stratosphere has resulted in mandates diminishing CFC use. Production of water-blown foams, in which blowing is performed with $CO_2$ generated by the reaction of water with the polyisocyanate, has therefore become increasingly important.

Tertiary amine catalysts are typically used to accelerate blowing (reaction of water with isocyanate to generate $CO_2$) and gelling (reaction of polyol with isocyanate). The ability of the tertiary amine catalyst to selectively promote either blowing or gelling is an important consideration in selecting a catalyst for the production of a particular polyurethane foam. If a catalyst promotes the blowing reaction to a too high degree, much of the $CO_2$ will be evolved before sufficient reaction of isocyanate with polyol has occurred, and the $CO_2$ will bubble out of the formulation, resulting in collapse of the foam. A foam of poor quality will be produced. In contrast, if a catalyst too strongly promotes the gelling reaction, a substantial portion of the $CO_2$ will be evolved after a significant degree of polymerization has occurred. Again, a poor quality foam, this time characterized by high density, broken or poorly defined cells, or other undesirable features, will be produced.

Tertiary amine catalysts generally are malodorous and offensive and many have high volatility due to their low molecular weight. Release of tertiary amines during foam processing may present significant safety and toxicity problems, and release of residual amines from consumer products is generally undesirable.

Amine catalysts which contain urea functionality (e.g., RNHCONHR') have an increase in molecular weight and hydrogen bonding and, therefore, reduced volatility and odor when compared to related structures which lack this functionality. Furthermore, catalysts which contain urea functionality chemically bond into the urethane during the reaction and are not released from the finished product. Catalyst structures which embody this concept are typically of low to moderate activity and promote both the blowing (water-isocyanate) and the gelling (polyol-isocyanate) reactions to varying extents.

U.S. Pat. No. 5,859,079 discloses a polyurethane catalyst composition for making flexible polyurethane foam comprising N,N'-bis(3-dimethylaminopropyl) urea and 3-dimethylaminopropyl urea in a ratio that can be varied to systematically control flowability, airflow and force-to-crush physical properties of the resulting flexible foam.

U.S. Pat. No. 4,644,017 discloses the use of certain diffusion stable amino alkyl ureas having tertiary amino groups in the production of a polyisocyanate addition product which do not discolor or change the constitution of surrounding materials. Specifically taught are Catalyst A and Catalyst D which are reaction products of dimethylaminopropylamine and urea.

U.S. Pat. No. 4,007,140 discloses the use of N,N'-bis(3-dimethylaminopropyl)urea as a low odor catalyst for the manufacture of polyurethanes.

U.S. Pat. No. 4,194,069 discloses the use of N-(3-dimethylaminopropyl)-N'-(3-morpholinopropyl)urea, N,N'-bis(3-dimethylaminopropyl)urea and N,N'-bis(3-morpholinopropyl)urea as catalysts for producing polyurethane foams.

U.S. Pat. No. 4,094,827 discloses the use of certain alkyl substituted ureas including N,N-bis(3-dimethylaminopropyl)urea which provide lower odor and a delay in the foaming reaction that aids in the production of polyurethane foam.

U.S. Pat. No. 4,330,656 discloses the use of N-alkyl ureas as catalysts for the reaction of 1,5-napthylene diisocyanate with polyols or for the chain extension of prepolymers based upon 1,5-napthylene diisocyanate without accelerating atmospheric oxidation.

DE 30 27 796 A1 discloses the use of higher molecular weight dialkyl aminoalkyl ureas as reduced odor catalysts for the production of polyurethane foam.

U.S. Pat. No. 4,310,632 and U.S. Pat. No. 5,057,480 disclose a process for making polyurethane using a defined catalyst.

SUMMARY OF THE INVENTION

The present invention provides a catalyst composition for use in making rigid polyurethane foam. The catalyst composition comprises 3-dimethylaminopropyl urea and N,N'-bis(3-dimethylaminopropyl) urea, i.e., the mono- and bis-ureas of 3-dimethylamino-propylamine, respectively. Using this catalyst composition, which comprises a mixture of the mono and bis alkyl substituted ureas in amounts from >0 to <100 mole % mono-urea and >0 to <100 mole % bis-urea improves the physical properties of the polyurethane foam.

The ratio of the two urea compounds can be varied to systematically control % open cell content, k-factor value and flowability of the reacting foam-forming components to enhance processibility. Increasing the N,N'-bis(3-dimethylaminopropyl) urea to 3-dimethylaminopropyl urea ratio decreases the % open cell content and the k-factor values of the foam while decreasing the N,N'-bis(3-dimethylaminopropyl) urea to 3-dimethylaminopropyl urea ratio improves the flowability of the foaming composition.

The % open cell content is a measurement for estimating the loss of blowing agents by their diffusion through the foam cells. This is comparable to the diffusion of air through the foam cells, i.e., "airflow" through the foam. Higher open cell content means greater diffusion of gases, greater airflow.

The k-factor is a measurement of the thermal conductivity of insulating materials, in this case the rigid polyurethane foam. The lower the k-factor of the rigid foam the better its insulating property. For insulating foam the object is to retain the blowing agent in the cells to maintain the low k-factor. Thus, less open cell content in the foam is desirable. The present invention is of value in appliances, e.g., freezers and refrigerators, and lamination boards containing insulating foam as well as in other k-factor critical applications.

In contrast to U.S. Pat. No. 5,859,079 which teaches increasing the bis-urea to mono-urea ratio of the catalyst blend to increase the airflow in a flexible foam, in rigid foams according to the present application increasing the bis-urea to mono-urea ratio of the catalyst blend decreases open cell content of the foam and concomitantly decreases the airflow; opposite to the effect taught in U.S.079.

Moreover, while it is recognized in the art that the k-factor of the foam typically varies essentially in direct proportion to the % open cell content, the decrease in the k-factor with increasing bis-urea to mono-urea ratio of the catalyst blend was much more dramatic than would be expected from the decrease in open cell content.

When rigid foams are desired for vacuum panel or other non-k-factor critical applications, using a catalyst composition with decreasing bis-urea to mono-urea ratio improves the flowability of the foaming composition.

An additional advantage of these catalysts is that they contain a ureido group which will react with isocyanate and chemically bond into the urethane during the reaction; therefore, the catalyst is not released from the finished foam product.

DETAILED DESCRIPTION OF THE INVENTION

The catalyst compositions used in the invention catalyze the reaction between an isocyanate functionality and an active hydrogen-containing compound. i.e. an alcohol, a polyol, an amine or water, especially the urethane (gelling) reaction of polyol hydroxyls with isocyanate to make polyurethanes and the blowing reaction of water with isocyanate to release carbon dioxide for making foamed polyurethanes.

Rigid polyurethane foams typically can be distinguished from flexible foams by the presence of higher levels of isocyanurate in the rigid foam. In addition, flexible foam typically uses polymer polyol as part of the overall polyol content in the foam composition, along with conventional triols of 4000–5000 weight average molecular weight (Mw) and hydroxyl number (OH #) of 28–35. In contrast, rigid polyurethane foam compositions use 500–1000 Mw polyols with OH # of 160–700. Rigid foam can also be differentiated from flexible foam by the isocyanate (NCO) index of the foam composition. Rigid foam compositions typically use a 100–300 NCO index whereas flexible foam compositions typically requires a 70–115 NCO index.

The rigid polyurethane foam products are prepared using any suitable organic polyisocyanates well known in the art including, for example, hexamethylene diisocyanate, phenylene diisocyanate, toluene diisocyanate ("TDI") and 4,4'-diphenylmethane diisocyanate ("MDI"). Especially suitable isocyanates are mixtures of diisocyanates known commercially as "crude MDI", marketed as PAPI by Dow Chemical, which contain about 60% of 4,4'-diphenylmethane diisocyanate along with other isomeric and analogous higher polyisocyanates. Other suitable isocyanates are the 2,4- and 2,6-TDI's individually or together as their commercially available mixtures. Also suitable are "prepolymers" of these polyisocyanates comprising a partially prereacted mixture of a polyisocyanate and a polyether or polyester polyol.

Illustrative of suitable polyols as a component of the rigid polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, like phthalic anhydride with diethylene glycol, or reacting a lactone with an excess of a diol such as caprolactone with propylene glycol. Typical OH# values for these polyester materials range from 160–490.

Other typical agents found in the polyurethane foam formulations include chain extenders such as ethylene glycol and butanediol; crosslinkers such as diethanolamine, diisopropanolamine, triethanolamine and tripropanolamine; blowing agents such as the chemical blowing agent water, and physical blowing agents such as CFCs, HCFCs, HFCs, pentane, and the like; and cell stabilizers such as silicones.

A general polyurethane rigid insulating foam formulation having a 0.5–5 lb/ft$^3$ (8–80 kg/m$^3$) density (e.g., appliance foam; lamination board) containing a catalyst such as the catalyst composition according to the invention would comprise the following components in parts by weight (pbw):

| Rigid Foam Formulation | pbw |
|---|---|
| Polyol | 100 |
| Silicone Surfactant | 1–3 |
| Physical Blowing Agent | 0–50, preferably 2–50 |
| Water | 0–4, preferably 1–4 |
| Co-Catalyst | 0–5, preferably 0.2–5 |
| Invention Catalyst | 0.5–10 |
| Isocyanate Index | 100–300 |

For making lamination (insulation board) and appliance foams the NCO index is typically 100–300; for making open cell foam the NCO index is typically 100–120 and the foam is usually all water blown.

The reactive catalyst compositions for controlling process latitude in making rigid polyurethane foams in a cost effective manner comprise the compounds represented by the following formulas I and II in any mole % ratio, preferably. The mole % is based on moles of mono-urea (I) and bis-urea (II). In order to improve the flowability of the foaming composition, the catalyst composition should contain 50 to 95 mole % mono-urea (I) and 5 to 50 mole % bis-urea (II), preferably 80 to 95 mole % mono-urea (I) and 5 to 20 mole % bis-urea (II). To decrease the % open cell content and k-factor values of the rigid foam the catalyst composition should be 5 to 50 mole % mono-urea (I) and 50 to 95 mole % bis-urea (II), preferably 5 to 20 mole % mono-urea (I) and 80 to 95 mole % bis-urea (II). In addition, as a result of the preparation procedure the catalyst composition may contain up to 20 wt % unreacted urea (III), based on the weight of compounds (I) and (II).

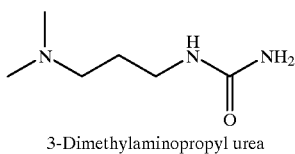

3-Dimethylaminopropyl urea

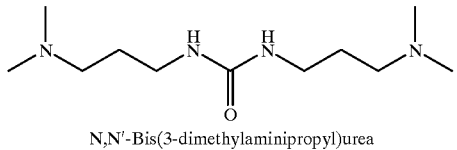

N,N'-Bis(3-dimethylaminipropyl)urea

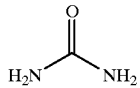

Compounds I and II are prepared by reacting urea and N,N-dimethylamino-propylamine in the appropriate molar ratios under an inert atmosphere at elevated temperatures. Compounds I and II can be isolated individually by chromatographic techniques known in the synthesis art.

A catalytically effective amount of the catalyst composition is used in the polyurethane formulation. More specifically, suitable amounts of the catalyst composition may range from about 0.01 to 10 parts by wt per 100 parts polyol (pphp) in the polyurethane formulation, preferably 0.05 to 1 pphp.

The catalyst composition may be used in combination with, or also comprise, other tertiary amine, organotin or carboxylate urethane catalysts well known in the urethane art.

EXAMPLE 1

Synthesis of 3-Dimethylaminopropyl Urea (I)

A 94:6 mole ratio blend of 3-dimethylaminopropyl urea (I) and N,N'-bis(3-dimethylaminopropyl) urea (II) catalyst mixture was prepared using a one liter 3 neck round bottom flask fitted with the following: mechanical stirrer, reflux condenser, nitrogen bubbler, and a temperature controlled heating mantle. The flask was charged with 176.3 g of urea [$CH_4N_2O$] and 300.0 g of N,N-dimethylaminopropylamine [$(CH_3)_2NCH_2CH_2CH_2NH_2$]. The mixture was stirred at a constant rate while being slowly heated to 120° C. The reaction was controlled at 120° C. until all signs of $NH_3$ evolution had ceased (as evidenced by bubbling in the $N_2$ pressure relief device). The pale yellow liquid was cooled to 80° C. and the flask containing the liquid was evacuated via vacuum pump and refilled with $N_2$ three times to remove any volatiles still present. Quantitative $^{13}C$ NMR showed the final product to be 86 mole % 3-dimethylaminopropyl urea (I), 5 mole % N,N'-bis(3-dimethylaminopropyl) urea (II), and 9 mole % unreacted urea. The mono to bis mole ratio is 17.2 to 1, or 94:6 ratio of mono urea to bis urea.

EXAMPLE 2

Synthesis of N,N'-Bis(3-Dimethylaminopropyl) Urea (II)

A one liter 3 neck round bottom flask was fitted with the following: mechanical stirrer, reflux condenser, nitrogen bubbler, and a temperature controlled heating mantle. The flask was charged with 83.96 g of urea [$CH_4N_2O$] and 300 g of N,N-dimethylamino-propylamine [$(CH_3)_2NCH_2CH_2CH_2NH_2$]. The mixture was stirred at a constant rate while being slowly heated to 120° C. The reaction was controlled at 120° C. for 1.5 hours and then the reaction temperature was increased to 140° C., 160° C. and finally 180° C. The temperature was increased each time after ammonia evolution stopped. Excess N,N-dimethylaminopropylamine was removed via distillation. Quantitative $^{13}C$ NMR showed the product to be 98 mole % N,N'-bis(3-dimethylaminopropyl) urea (II) and 2 mole % 3-dimethylaminopropyl urea (I).

EXAMPLE 3

A conventional polyurethane foam was prepared using the formulation listed below with the components in parts by weight (pbw):

| COMPONENT | pbw |
|---|---|
| Polyol A and Polyol B Blend | 65.11 |
| Water | 1.16 |
| 141b | 27.0 |
| PC 41 | 0.43 |
| PC 5 | 0.86 |
| DC5357 | 2.19 |
| Catalyst (I and/or II) | varied |
| Polymeric MDI | 115 Index |

Polyol A—a conventional polyether polyol.
Polyol B—a conventional polyester polyol.
Forane® 141b—a conventional auxiliary HCFC blowing agent marketed by Elf Atochem.
DABCO® Polycat 41—a conventional tertiary amine catalyst marketed by Air Products and Chemicals, Inc. (APCI)
DABCO Polycat 5—a conventional tertiary amine catalyst marketed by APCI
DABCO® DC-5357—a conventional silicone surfactant marketed by APCI
Polymeric MDI—a conventional polymeric MDI.

A polyurethane foam was prepared in a conventional manner in a typical 12×12×2 inch (30.5×30.5×5.1 cm) horizontal base/12×24×2 inch (30.5×61×5.1 cm) vertical leg L-mold uniformly heated and maintained at 140° F. (60° C.). The polyurethane formulation in parts by weight was listed above. The catalyst levels used are all compared at equal reactivity levels based on equivalent string gel times as determined in free rise foam testing.

A conventional molded polyurethane foam was prepared using the formulation listed above. The formulation is prepared without the catalyst in a capable bottle and shaken by hand for 10 min to afford complete mixing of the components. The masterbatch is then stored in a 23° C. incubator for approximately 2 hr. 1.29 g of catalyst was added to 220.49 g of the masterbatch in a 32 oz (946 mL) paper cup and the complete masterbatch was mixed for 10 sec at 6000 rpm using an overhead stirrer fitted with a 2 inch (5.1 cm) diameter stirring paddle. The blowing agent which was evaporated during the mixing was now back-added. Sufficient polymeric MDI was added to the cup mixture to make a 115 index foam {index=(mole NCO/mole active hydrogen)×100}. The complete formulation was mixed well for 5 sec using the same overhead stirrer. The 32 oz (946 mL) cup was dropped through a hole in the top and down through the bottom of the horizontal section of the 2 inch thick L-shaped vent mold. The cup does not slip through the lower hole due to a rolled lip at the top of the can that forms a tight seal. The mold was pre-heated to a stable 140° F. (60° C.). The molds' internal horizontal and vertical dimensions produce a finished foam with maximum dimensions of 11×12 in (28×30.5 cm) on center and 25×12 in (63.5×30.5 cm) on center, respectively, with a thickness of 2 in (5.1 cm). The bottom hole was sized to catch the top lip of the 32 oz (946 mL) cylindrical cup. Quickly, the top hole was tightly sealed to force the foam flow horizontally and then up through the vertical leg of the mold. After 6 min, the top of the mold is removed and the cured foam is demolded. The paper cup is removed from the foam part and the average height of the vertical leg is measured in millimeters as an indication of flow properties of the foaming mass. After 24 hr, a 8×8×1 in (20.3×20.3×2.5 cm) section is cut from the vertical leg, centered approximately 2 in (5.1 cm) above the elbow. This section is tested for K-factor utilizing a Lasercomp Fox 200 heat flow meter instrument and reported in British thermal units—(inch/hr-ft$^2$-° F.) and watts/meter-° K. (W/mK). The tested section is then cut into triplicate 2×2×1 in (5.1×5.1×2.54 cm) samples and tested for compressive strength. The remaining portion of the K-factor panel is cut into duplicate 1 in$^3$ (2.54 cm$^3$) samples and tested for % open/closed cell content utilizing a Quantachrome pycnometer.

Table I lists the physical properties obtained using the catalysts from Examples 1–3. The foam tested met standard specifications and the tests were performed using ASTM designation D 2856 for the % Open Cell Content and C177 for the K-factor values.

TABLE I

|  | Example 1 Catalyst[a] | Example 2 Catalyst[a] | Control Catalyst[a] |
| --- | --- | --- | --- |
| Mono/Bis Ratio | 94:6 | 2:98 | — |
| pphp | 0.97 | 0.97 | 0 |
| Foam Height (mm) | 502 | 493 | 508 |
| % Open Cell | 17.0 | 14.5 | 18.4 |
| k-factor[b] (Btu; W/mK) | 0.148; 0.0213 | 0.126; 0.0181 | 0.129; 0.0186 |

[a]All catalyst combinations include equivalent control catalyst levels of PC41 and PC5.
[b]In the polyurethane insulating foam industry a change in the k-factor value of the foam of ±0.003 or more is a significant difference.

Example 3 demonstrates that increasing levels of N,N'-bis(3-dimethylaminopropyl) urea (II) decreases foam height, % open cell content and k-factor physical properties of rigid foam. This improvement is of value for insulation applications, such as appliance and lamination. Based on the prior art, it was unexpected that Example 1 and 2 catalysts would result in different rigid foam physical properties.

U.S. Pat. No. 4,644,017 Table 3 indicates that 3-dimethylaminopropyl urea (Catalyst A) and N,N'-bis(3-dimethylaminopropyl) urea (Catalyst D) provided equivalent performance for PVC foil backed semi-rigid foam. Therefore, one skilled in the art would expect no performance improvements by using mixtures of these catalysts. Unexpectedly, mixtures of these catalysts do provide performance improvements in rigid foam.

U.S. Pat. No. 4,007,140 example 6 demonstrates that N,N'-bis(3-dimethylaminopropyl) urea produced foam of higher resiliency than the control. Furthermore, U.S. Pat. No. 4,194,069 indicates that N,N'-bis(3-dimethylaminopropyl) urea produced slight foam shrinkage and course cells compared to N-(3-dimethylaminopropyl)-N'-(3-morpholinopropyl)urea. Thus, to lower the k-factor values and open cell content of a rigid foam one would not be motivated to add N,N'-bis(3-dimethylaminopropyl) urea or increase the ratio of N,N'-bis(3-dimethylaminopropyl) urea to 3-dimethylaminopropyl urea. Decreasing the N,N'-bis(3-dimethylaminopropyl) urea to 3-dimethylaminopropyl urea ratio improves the flowability of the foam. The advantage of the present invention is that catalyst ratios may be used to systematically control flowability, open cell content, and k-factor, therefore providing greater processing latitude in rigid foam.

U.S. Pat. No. 5,859,079 describes the ability to predict and systematically control physical properties of flexible foams made with varied ratios of N,N'-bis(3-dimethylaminopropyl) urea and 3-dimethylaminoproply urea. Increasing the level of N,N'-bis(3-dimethylaminopropyl) urea resulted in an increase in airflow, decrease in force-to-crush, and decrease in flowability of the foam. However, when the ratio of N,N'-bis(3-dimethylaminopropyl) urea and 3-dimethylaminopropyl urea are varied in rigid foam applications, the airflow decreases as a result of lower open cell content. This result is unexpected based on the results in flexible foam formulations. The decrease in open cell content will produce improved (lower) k-factor values; however, the significant difference in k-factor produced from example 1 catalyst compared to example 2 catalyst is even more surprising. The improvement in the flow for rigid foams follows the same trend as seen in flexible foam applications. As the amount of 3-dimethylaminopropyl urea increases, the flowability of the foam improves.

STATEMENT OF INDUSTRIAL APPLICATION

The invention provides catalyst compositions for making rigid polyurethane foam.

We claim:

1. In a method for preparing a rigid polyurethane foam by reacting an organic polyisocyanate and a polyol in the presence of a blowing agent, a cell stabilizer and a catalyst composition, the improvement for controlling the processing latitude of the foam which comprises using a catalyst composition consisting essentially of >0 to <100 mole % 3-dimethylaminopropyl urea and >0 to <100 mole % N,N'-bis(3-dimethyl-aminopropyl) urea.

2. The method of claim 1 for improving the flowability of the rigid polyurethane foam which comprises using a catalyst composition comprising 50 to 95 mole % 3-dimethylaminopropyl urea and 5 to 50 mole % N,N'-bis(3-dimethylaminopropyl) urea.

3. The method of claim 1 for improving the flowability of the rigid polyurethane foam which comprises using a catalyst composition comprising 80 to 95 mole % 3-dimethylaminopropyl urea and 5 to 20 mole % N,N'-bis(3-dimethylaminopropyl) urea.

4. The method of claim 1 for reducing the % open cell content and k-factor value of the rigid polyurethane foam which comprises using a catalyst composition comprising 5 to 50 mole % 3-dimethylaminopropyl urea and 50 to 95 mole % N,N'-bis(3-dimethylaminopropyl) urea.

5. The method of claim 1 for reducing the % open cell content and k-factor value of the rigid polyurethane foam which comprises using a catalyst composition comprising 5 to 20 mole % 3-dimethylaminopropyl urea and 80 to 95 mole % N,N'-bis(3-dimethylaminopropyl) urea.

6. The method of claim 1 in which the catalyst composition is used in combination with other tertiary amine, organotin, or carboxylate urethane catalysts.

7. The method of claim 2 in which the catalyst composition is used in combination with other tertiary amine, organotin, or carboxylate urethane catalysts.

8. The method of claim 3 in which the catalyst composition is used in combination with other tertiary amine, organotin, or carboxylate urethane catalysts.

9. The method of claim 4 in which the catalyst composition is used in combination with other tertiary amine, organotin, or carboxylate urethane catalysts.

10. The method of claim 5 in which the catalyst composition is used in combination with other tertiary amine, organotin, or carboxylate urethane catalysts.

11. In a polyurethane rigid foam composition having a 0.5–5 lb/ft$^3$ (8–80 kg/m$^3$) density and comprising the following components in parts by weight (pbw):

| Rigid Foam Formulation | pbw |
|---|---|
| Polyol | 100 |
| Silicone Surfactant | 1–3 |
| Physical Blowing Agent | 0–50 |
| Water | 0–4 |
| Co-Catalyst | 0–5 |
| Urea Catalyst | 0.5–10 |
| Isocyanate Index | 100–300 | the improvement for controlling the processing latitude of the foam which comprises using a urea catalyst composition consisting essentially of >0 to <100 mole % 3-dimethyl-aminopropyl urea and >0 to <100 mole % N,N'-bis(3-dimethyl-aminopropyl) urea.

12. The rigid foam composition of claim 11 for improving the flowability of the rigid polyurethane foam in which the urea catalyst composition comprises 50 to 95 mole % 3-dimethylaminopropyl urea and 5 to 50 mole % N,N'-bis(3-dimethylaminopropyl) urea.

13. The rigid foam composition of claim 11 for improving the flowability of the rigid polyurethane foam in which the urea catalyst composition comprises 80 to 95 mole % 3-dimethylaminopropyl urea and 5 to 20 mole % N,N'-bis(3-dimethylaminopropyl) urea.

14. The rigid foam composition of claim 11 for reducing the % open cell content and k-factor value of the rigid foam in which the urea catalyst composition comprises 5 to 50 mole % 3-dimethylaminopropyl urea and 50 to 95 mole % N,N'-bis(3-dimethylaminopropyl) urea.

15. The rigid foam composition of claim 11 for reducing the % open cell content and k-factor value of the rigid foam in which the urea catalyst composition comprises 5 to 20 mole % 3-dimethylaminopropyl urea and 80 to 95 mole % N,N'-bis(3-dimethylaminopropyl) urea.

16. The rigid foam composition of claim 11 in which the co-catalyst composition comprises one or more tertiary amine, organotin, or carboxylate urethane catalysts.

17. The rigid foam composition of claim 12 in which the co-catalyst composition comprises one or more tertiary amine, organotin, or carboxylate urethane catalysts.

18. The rigid foam composition of claim 13 in which the co-catalyst composition comprises one or more tertiary amine, organotin, or carboxylate urethane catalysts.

19. The rigid foam composition of claim 14 in which the co-catalyst composition comprises one or more tertiary amine, organotin, or carboxylate urethane catalysts.

20. The rigid foam composition of claim 15 in which the co-catalyst composition comprises one or more tertiary amine, organotin, or carboxylate urethane catalysts.

21. A freezer or refrigerator appliance containing an insulating appliance foam made according to claim 4.

22. A lamination board containing an insulating foam made according to claim 4.

* * * * *